United States Patent

Bennett et al.

[15] 3,675,197
[45] July 4, 1972

[54] BRAKE LINING WEAR SENSING CIRCUIT

[72] Inventors: Ronald W. Bennett, Miamisburg; Donald L. Parker, Middletown; Arthur R. Shaw, Dayton, all of Ohio

[73] Assignee: General Motors Corporation, Detroit, Mich.

[22] Filed: June 26, 1970

[21] Appl. No.: 50,247

[52] U.S. Cl...........................340/52 A, 180/103, 188/1 A, 200/61.4
[51] Int. Cl. .......................................................B60t 17/22
[58] Field of Search......................340/52 A, 52 R; 180/103; 188/1 A; 200/61.4, 61.44

[56] References Cited

UNITED STATES PATENTS 3,363,232  1/1968  Mizsak................................340/52 A Primary Examiner—John W. Caldwell
Assistant Examiner—Glen R. Swann, III
Attorney—J. L. Carpenter and Paul Fitzpatrick

[57] ABSTRACT

Vehicle brake apparatus including a plurality of series connected conductive sensors secured to the brake shoes of a vehicle by clips which support each of the sensors proximate an electrically grounded brake drum and at a predetermined level above the brake shoes, below which level brake lining wear is deemed excessive. When a brake lining is excessively worn by a brake drum the sensor secured to the brake shoe which supports the brake lining is contacted and grounded by the brake drum. A grounded indicator network is series connected with the sensors to provide for energizing an indicator device when a sensor is grounded so as to indicate excessive wear of a brake lining. A grounded switch is series connected with the sensors and the indicator network for checking the operation of the sensors and the indicator network. When the switch is closed the indicator device is energized if the indicator network and the sensors are operative.

8 Claims, 7 Drawing Figures

Patented July 4, 1972
3,675,197
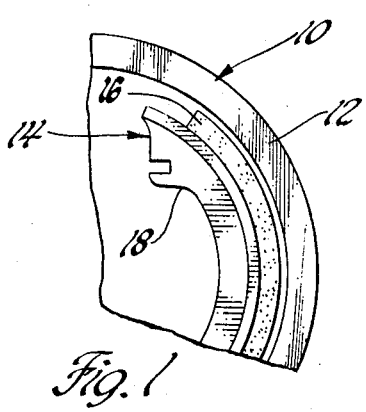
Fig. 1
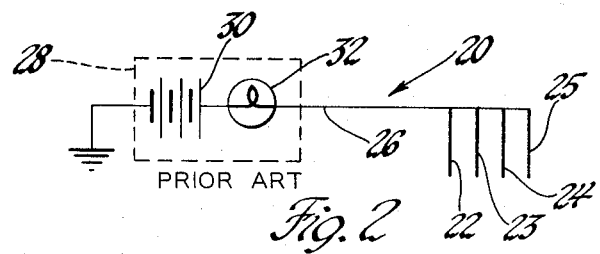
Fig. 2
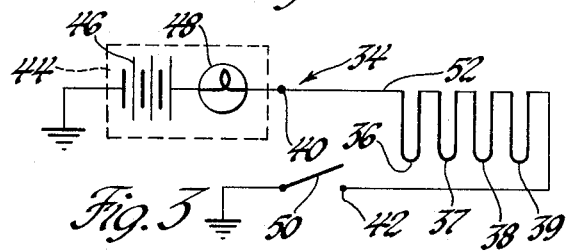
Fig. 3
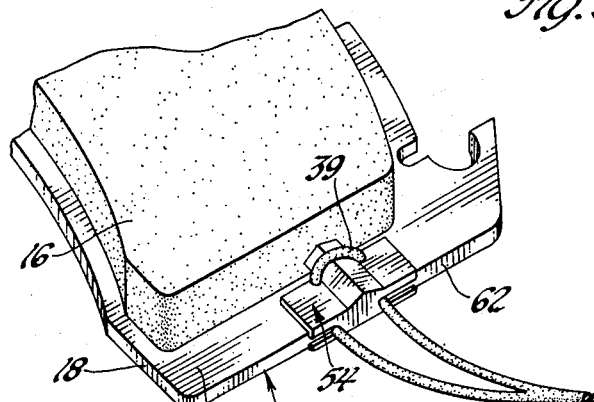
Fig. 4
Fig. 5
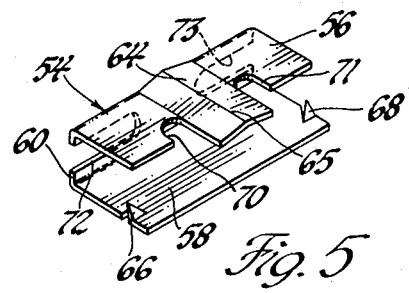
Fig. 6
Fig. 7
INVENTORS
Ronald W. Bennett,
Donald L. Parker &
BY Arthur R. Shaw
Paul Fitzpatrick
ATTORNEY

BRAKE LINING WEAR SENSING CIRCUIT

The clips secure the sensors to the brake shoes each include first and second spaced plates connected by a third plate so as to form a channel unit of substantially U-shape cross sectional configuration having flanges formed by the first and second plates and an open side opposed to the third plate surface for insertion of a brake shoe edge into the channel unit. A sensor supporting gable is joined to the first plate to facilitate supporting a sensor at a predetermined level above the brake shoe inserted within the clip. Brake shoe engaging projections are joined to the second plate so as to engage the brake shoe and prevent relative movement between the brake shoe and the clip. Several ways are formed in the first and third plates to facilitate looping the sensor supporting gable with a wire loop sensor and securing the wire loop sensor to the sensor supporting gable by passing the leads to the sensor through the ways so as to frictionally restrain movement of the leads between the brake shoe and the first plate of the clip.

BACKGROUND OF THE INVENTION

This invention relates to vehicle brake systems employing brake assemblies which include a brake drum rotatable with a vehicle wheel, a brake lining frictionally cooperating with the brake drum for braking the vehicle, and a brake shoe for supporting the brake lining and moving the brake lining into frictional engagement with the brake drum to effect braking of the vehicle. More particularly, this invention relates to vehicle brake apparatus having a provision for indicating excessive wear of brake linings.

Wheeled vehicles customarily are brought to a stop by frictional braking of the vehicle wheels. Accordingly, each of the vehicle wheels is customarily provided with a brake drum which is rotatable with the wheel and a non-rotatable brake shoe assembly including a brake lining supported by a brake shoe that is movable to place the brake lining in frictional engagement with the brake drum so as to effect braking of the vehicle. While various brake assembly configurations have been proposed to date they virtually all operate in accordance with the foregoing principle.

Presently there are two such configurations being widely used. The more conventional configuration employs a cylindrical brake drum rotatable with the vehicle wheel and at least one brake shoe assembly positioned within the brake drum so as to be radially movable relative to the brake drum to frictionally engage the brake drum with a brake lining. Due to the configuration of the rotatable member this type of vehicle brake is called a "drum brake." The other well-known brake configuration employs a substantially flat rotatable member, called a disc, and at least one brake shoe assembly positioned adjacent the disc so as to be axially movable, relative to the disc, into frictional engagement with the disc to effect braking of the vehicle. This type of brake assembly configuration is called a "disc brake." Inasmuch as both drum brakes and disc brakes employ non-rotatable brake shoe assemblies which include brake linings supported by brake shoes and rotatable members frictionally engaged by the brake linings to effect braking of the vehicle, this description will hereafter employ the term "brake drum" to mean a brake assembly member which is rotatable with a vehicle wheel regardless of whether the brake drum is a disc, a cylinder, or another configuration. Similarly, the term "brake lining" shall be used in reference to a non-rotatable brake assembly member which is brought into frictional engagement with a brake drum and the term "brake show" shall be used in reference to a brake assembly member which supports a brake lining and moves the brake lining into frictional engagement with the brake drum.

Due to the considerable energy which is dissipated by the brakes of a vehicle when the vehicle is being stopped the brake linings of the vehicle are subject to considerable wear. Since the friction surface of a brake lining is usually less than that of a brake drum the brake linings of a vehicle are subject to excessive wear leading to relatively frequent replacement. Wear of vehicle brake linings is further increased by the well-known practice of making them from softer material than brake drums to optimize vehicle braking characteristics. Accordingly, various techniques have been proposed to indicate to the vehicle operator when the brake linings are excessively worn and their replacement is in order.

Many of these prior indicator devices have been electrical in nature and provide for electrically grounding the brake drums of the vehicle and positioning an insulated conductive sensor within the brake linings associated with the brake drums. When a brake lining is worn sufficiently to expose a sensor the sensor is grounded upon subsequent application of the vehicle brakes and an indicator circuit is employed to indicate when the sensor is grounded. Schweikle U.S. Pat. No. 2,146,357, discloses a circuit employing this broad idea. However, problems have arisen when sensors have been embedded in brake linings due to the considerable heat generated within the linings when the vehicle is braked. The heat so generated tends to melt the insulation of leads to the sensors and softens the leads themselves, which often is a factor in shortening their expected useful life. Accordingly, either sophisticated sensor designs or relatively expensive temperature insensitive materials have been required to embed sensor contacts in brake linings. Furthermore, brake lining wear indicator circuits have not heretofore contained a provision for completely checking the operativeness of the indicator circuit and sensors. This is primarily because, as in the Schweikle patent, the sensors at the respective wheels have been connected in parallel and the operation of each sensor has thus not readily been detectable. Accordingly, provisions for checking the operativeness of a detector circuit have heretofore been directed toward checking the operation of the indicator devices and power sources employed in the circuits associated with the sensors but have not checked the operation of the sensors themselves. Accordingly, a vehicle operator may inadvertently reply upon an erroneous indication provided him by a brake lining indicator circuit until a brake lining is so excessively worn that damage results to a brake assembly.

SUMMARY OF THE INVENTION

It is therefore an object of this invention to provide vehicle brake apparatus with provisions for indicating excessive wear of brake linings and for checking operativeness of the indicator circuit and the sensors employed in monitoring the brake lining wear.

Another object of this invention is to provide vehicle brake apparatus with provisions for indicating excessive wear of brake linings and for securing sensors employed to monitor brake lining wear to the vehicle's brake shoes through use of self-attaching clips of a unique design that does not require additional fastening devices.

BRIEF DESCRIPTION OF THE DRAWINGS

The foregoing and other objects and advantages of the subject invention will become apparent from the following description and drawings, in which:

FIG. 1 is a conventional brake assembly suitable for use in conjunction with the present invention, FIG. 2 is a schematic diagram of a conventional circuit for detecting brake lining wear in the brake assembly of FIG. 1, FIG. 3 is a schematic diagram of a brake lining wear indicator circuit embodying principles of the subject invention for indicating excessive wear of brake linings, FIG. 4 is a perspective view of the brake shoe assembly disclosed in FIG. 1 with a sensor attached to the brake shoe by a clip incorporating principles of the present invention, FIG. 5 is a detailed view of the clip disclosed in FIG. 4, and FIGS. 6 and 7 are schematic diagrams of alternate brake lining wear indicator circuits which may be employed in place of the circuit disclosed in FIG. 3.

DESCRIPTION OF THE PREFERRED EMBODIMENTS

The brake assembly, generally indicated by the numeral 10 in FIG. 1, is comprised of a brake drum 12 and a brake shoe assembly 14, which includes a brake lining 16 supported by a brake shoe 18 for movement relative to the brake drum 12 so as to effect braking of a vehicle (not shown) by frictional cooperation between the brake drum 12 and the brake lining 16 in the well-known manner, the brake shoe 18 may be moved by suitable well-known hydraulic or mechanical apparatus (not shown) of a conventional design.

A circuit 20 of the conventional type previously discussed is schematically illustrated in FIG. 2. The circuit 20 includes a plurality of conductive sensors 22 through 25 connected in parallel to a lead 26 which is in turn series connected with an indicator network 28 that includes a power source, such as a vehicle battery 30, and an indicator device, such as a lamp 32. The circuit 20 is employed in conjunction with the brake assembly 10 by electrically grounding the brake drum 12 and embedding a sensor, such as the sensor 22, in the brake lining 16 so as to insulate the sensor 22 from ground and position it at a predetermined level above the brake shoe 18, the predetermined level being selected as that level below which brake lining wear is deemed to be excessive.

In operation the lamp 32 remains deenergized until the brake lining 16 is worn sufficiently to expose the sensor 22 to the brake drum 12. Upon subsequent application of the vehicle brakes the brake shoe 18 places the brake lining 16 in frictional engagement with the electrically grounded brake drum 12, which contacts and grounds the sensor 22 so as to complete a current path through the lamp 32. The lamp 32 is thus energized each time the brakes are applied to advise the vehicle operator that at least one of the vehicle brake linings is excessively worn.

According to the present invention an indicator circuit 34, disclosed in FIG. 3, is provided with a plurality of series connected brake lining wear sensors 36 through 39, which are connected between first and second electrically conductive terminals 40 and 42, and an indicator network 44 which includes a power source, such as a vehicle battery 46, and an indicator device, such as a lamp 48, series connected to the sensors 36 through 39 at the first terminal 40. As will subsequently be explained, the sensors 36 through 39 are positioned so as to be grounded by the vehicle brake drums when a brake lining associated with a brake drum is excessively worn. For example, should the sensor 39 be grounded by contact with the brake drum 12 a current path is completed through the indicator network 44 and the sensors 36 through 39 to ground, energizing the lamp 48 so as to advise that the brake lining 16 is excessively worn.

The indicator circuit 34 also includes a checkout switch 50 connected between the second terminal 42 and ground for selectively checking the operativeness of the indicator circuit 34. When the vehicle operator desires to check the operativeness of the indicator circuit 34 he may do so by closing the normally open switch 50. A current path is then completed through the indicator network 44, the sensors 36 through 39, and the switch 50. The lamp 48 will thus be energized when the switch 50 is closed and the indicator circuit 34 does not contain an open circuit. Should the lamp 48 not become energized when the switch 50 is closed the vehicle operator is advised that a malfunction exists in the indicator circuit 34. Complete operativeness of the indicator circuit 34 may thus be checked inasmuch as a malfunction in the form of a grounded condition in the indicator circuit 34 that is not due to an application of the vehicle brakes or closure of the switch 50 would also energize the lamp 48 and advise the vehicle operator of the need for repairs.

As persons versed in the art will appreciate, the switch 50 may readily be incorporated into the ignition switches (not shown) presently employed in motor vehicles. These ignition switches customarily are turned to a "start" setting when starting the vehicle. By connecting the second terminal 42 to a "-start" contact in such an ignition switch the ignition switch would be made to function as the switch 50 so as to ground the second terminal 42 whenever the ignition switch is placed in the "start" setting. Accordingly, the lamp 48 would be energized whenever the vehicle was being started unless there is an open circuit in the indicator circuit 34. Upon changing the ignition switch to other than the "start" setting the lamp 48 would be deenergized unless a short circuit condition exists or one of the sensors 36 through 39 is grounded due to application of the vehicle brakes, as previously explained. Of course, as is equally apparent to persons versed in the art, additional contacts of the ignition switch may be series connected between the battery 46 and the lamp 48 to prevent these various grounded conditions from discharging the battery 46 when the vehicle is not in operation and its ignition is turned off. Additional contacts such as these will subsequently be discussed in connection with the circuits in FIGS. 6 and 7.

The sensors 36 through 39 may be of many diverse designs. However, inasmuch as the sensors 36 through 39 have a negligible resistance in the preferred embodiment, practical considerations of an economic nature suggest that the terminals 40 and 42 need merely be connected by a single wire 52 containing a plurality of loops formed to serve as the sensors 36 through 39. Since it is essential that the wire 52 not be grounded except by contact with a brake drum it is desirable that the wire 52 be of an insulated type to prevent accidental grounding. While the sections of the wire 52 which form the sensors 36 through 39 may be stripped of insulation so as to present the bare metal of the wire 52 to the respective brake linings the wire 52 insulation may be left intact in practice as a brake lining which contacts the wire 52 insulation, will quickly abrade the insulation and ground the wire 52. Accordingly, the term "sensor" shall hereafter be used in reference to those portions of the wire 52 which are positioned so as to be contacted by a brake drum and other portions of the wire 52 will be referred to merely as leads to the respective sensors. While in the preferred embodiment the wire 52 is of low resistance in some applications it may be desirable to indicate precisely where the wire 52 is short circuited to ground, as at the sensor 38. It is apparent to persons skilled in the art that in these applications the wire 52 may be selected to have a measurable resistance and the lamp 48 may be replaced by a current responsive meter calibrated to precisely indicate the location where the wire 52 is grounded. In applications such as this current through the meter, and hence the meter indication, would be proportional to the length of the wire 52 between the meter and ground.

According to the preferred embodiment, as illustrated in FIG. 4, the sensors 36 through 39 are secured to the vehicle brake shoe assemblies. In FIG. 4 the sensor 39 is secured to the brake shoe assembly 14 by a clip 54 in accordance with the principles of the subject invention. The clip 54, which is more clearly illustrated in FIG. 5, provides for positioning the sensor 39 proximate the brake lining 16, rather than embedded in the brake lining 16, and at a predetermined level above the brake shoe 18. As mentioned previously, the predetermined level is preselected to be that level below which wear of the brake lining 16 is deemed excessive and undesirable. Accordingly, when the brake lining 16 is excessively worn the brake drum 12 contacts and grounds the sensor 39 so as to energize the lamp 48 in the fashion previously discussed, thus indicating to the vehicle operator the worn condition of the brake lining 16.

While the clip 54 in the preferred embodiment is a single unit fabricated from sheet material the various portions of the clip 54 are designed to serve distinct purposes. It is therefore convenient to discuss the various portions of the clip 54 and their functions as individual elements joined together even though the clip 54 may be made as an integral unit.

As is most clearly seen in FIG. 5, the clip 54 includes first and second substantially spaced plates 56 and 58 joined together by a third plate 60 so as to form a channel unit of substantially U-shape cross section, the first and second plates 56 and 58 serving as the channel flanges with an open side provided opposed to the third plate 60. The clip 54 is thus designed for attachment to the brake shoe 18 by inserting an edge 62 of the brake shoe 18 through the open side of the unit as shown in FIG. 4. The clip 54 also includes a sensor supporting surface in the form of a gable 64 joined to the first plate 56 for supporting the sensor 39 at a predetermined level above the brake shoe 18. In the illustrated embodiment the sensor supporting gable 64 is formed as an externally directed embossment, relative to the channel, in the center of the first plate 56. The gable 64 is thus made as an integral part of the clip 54 and is formed with a center ridge 65 for precisely positioning the sensor 39 at the predetermined level.

In addition, the clip includes a pair of projections 66 and 68 joined to the second plate 58 for engaging the brake shoe 18 so as to prevent relative movement between the brake shoe 18 and the clip 54. The projections 66 and 68 may be formed as internally directed embossments, relative to the channel, in the second plate 58 and may be angled directed toward the third plate 60 to prevent accidental removal of the clip 54 from the brake shoe 18 once the clip 54 is attached to the brake shoe 18. By making the clip 54 from a thin piece of a resilient material and spacing the first and second plates 56 and 58 by a distance substantially equal to or slightly less than the brake shoe 18 thickness consistent engagement of the projections 66 and 68 with the brake shoe 18 is assured due to the resiliency of the clip 54 material. Should it be desirable to make the clip 54 an insulator it may be made of a plastic or other suitable insulator material having sufficient resiliency to assure that the projections 66 and 68 firmly engage the brake shoe 18, thus assuring that the clip 54 will not be accidentally dislodged from the brake shoe 18.

While many methods are available to secure the sensor 39 to the sensor support gable 64 of the clip 54, as through use of an adhesive, in the preferred embodiment this is achieved through employment of frictional forces between the clip 54 and the brake shoe 18. As shown in FIG. 4, the securement of the sensor 39 to the lip 54 is facilitated by removing portions of the first and third plates 56 and 60 to provide them with a plurality of ways 70 through 73 through which the leads to the sensor 39 are passed. The sensor 39 is thus looped about the gable 64 and the leads to the sensor 39 extend between the first plate 56 and the brake shoe 18. Due to the resiliency of the clip 54 the top surface 74 of the brake shoe 18 would be pressed against the first plate 56 of the clip 54 were it not for the leads to the sensor 39 positioned between them. Accordingly, the leads to the sensor 39 are securely held by frictional forces between the first plate 56 of the clip 54 and the top surface 74 of the brake shoe 18. The leads to the sensor 39 thus serve to hold the sensor 39 in place on the sensor supporting gable 64.

As an alternative to the indicator circuit 34 of FIG. 3 a relay circuit 34', illustrated in FIG. 6, may be employed to monitor the sensors 36 through 39 for both excessive brake lining wear and open circuits. In the relay circuit 34' a pair of relays 76 and 78 control the energization of the lamp 48. This is effected by the first relay 76 controlling a set of normally closed contacts 80 and the second relay 78 controlling a pair of normally open contact sets 82 and 84. The circuit 34' also includes a bias resistor 86 and a switch 88 that may be coupled to the vehicle ignition switch so as to be closed when the ignition switch is in either the "on" or "start" setting, thus controlling the operativeness of the indicator circuit 34' as will now be explained.

When the switch 88 is closed by turning the ignition switch to the "on" setting the first relay 76 is energized through the sensors 36 through 39 so as to open the normally closed contacts 80 and prevent energization of the lamp 48. By selecting the first relay 76 to have a relatively large resistance the passage of a large current through the second relay 78 is prevented so as to keep the second relay 78 deenergized. However, should one of the vehicle brake linings, such as the brake lining 16, become excessively worn the sensors 36 through 39 would be placed at ground potential due to the brake drum 12 contacting and grounding the sensor 39 when the vehicle brakes are applied. When this occurs the full potential of the battery 46 is applied across the second relay 78, causing sufficient current to pass through the second relay 78 to energize the second relay 78 and close the contacts 82 and 84. Upon closure of the contacts 82 the second relay 78 is latched in its energized condition until the switch 88 is opened by changing the ignition switch setting, as by placing it in an "off" position. Simultaneously, closure of the contacts 84 completes a current path through the lamp 48 so as to energize the lamp 48 and advise the vehicle operator that excessive brake lining wear has taken place. Should the wire 52 be inadvertently grounded by a short circuit when the vehicle brakes are not applied the same sequence of events causes the lamp 48 to become energized and advise the vehicle operator that a malfunction exists.

The indicator circuit 34' also provides an indication of an open circuit in the wire 52. Should such an open circuit be present when the switch 88 is closed the first relay 76 will remain deenergized. The normally closed contacts 80 thus remain closed so as to ground the lamp 48, energizing the lamp 48 and advising the vehicle operator of the open circuit condition so necessary corrections may be made of the malfunction.

The indicator circuit 34' is also provided with a switch 50' to check the lamp 48 operativeness by completing a direct current path through the lamp 48 to ground through the switch 50'. As previously discussed, the lamp 48 is energized whenever the wire 52 is open circuited or a short circuit has grounded the sensors 36 through 39 so it is unnecessary in the circuit 34' for the switch 50' to be series connected with the sensors 36 through 39, as in the indicator circuit 34 of FIG. 3.

In FIG. 7 an indicator circuit 34" is illustrated which is a transistorized version of the relay circuit 34' in FIG. 6. The indicator circuit 34" in FIG. 7 includes a pair of transistors 90 and 92 which are set at appropriate operating points by a plurality of bias resistors 93, 94, and 95. The indicator circuit 34" also includes a pair of voltage divider resistors 96 and 98 series connected to the sensors 36 through 39 for controlling the potential of the sensors 36 through 39 so as to facilitate monitoring the sensors 36 through 39 for grounded and open cirucited conditions.

Upon closure of the switch 88 in the indicator circuit 34" the voltage of the junction 99 between the sensor 39 and the resistor 98 is made relatively high by proper selection of the resistors 96 and 98. The junction 99 voltage is coupled through the resistor 95 to the base of the first transistor 90 so as to reverse bias its emitter-base junction, thus keeping the first transistor 90 turned off. Since the collector of the first transistor 90 is the source of base current for the second transistor 92 the second transistor 92 is thus kept nonconductive and the lamp 48, series connected with the second transistor 92 collector, is precluded from being energized. However, should one of the sensors 36 through 39 be grounded due to excessive wear of a brake lining or a short circuit condition in the wire 52 the junction 99 is connected to ground so as to forward bias the emitter-base junction of the first transistor 90, turning on the first transistor 90. When the first transistor 90 is turned on it provides sufficient base current to the second transistor 92 so as to turn on the second transistor 92, which completes a low resistance current path through the lamp 48. The lamp 48 is thus energized to advise the vehicle operator that excessive wear has taken place in a brake lining or that the wire 52 is short circuited to ground, depending on whether the lamp 48 is energized when the vehicle brakes are not applied.

In the event an open circuit occurs in the wire 52 in the indicator circuit 34" the normal current through the resistor 98, which had generated a voltage drop across the resistor 98, is interrupted and the base of the transistor 90 is coupled to ground through the resistors 95 and 98, turning on the first and second transistors 90 and 92 in the fashion previously discussed so as to energize the lamp 48. The lamp 48 is thus energized even though the vehicle brakes are not applied whenever the junction 99 is near ground potential regardless of whether the junction 99 is grounded due to a short circuit or an open circuit. In either event the lamp 48 indicates the presence of a malfunction to the vehicle operator so that appropriate repairs can be made.

In the indicator circuit 34'' of FIG. 7 the switch 50'' is connected between the junction 99 and ground to provide for checking the operativeness of both the transistor networks and the lamp 48. Upon closure of the switch 50'' the junction 99 is grounded so as to forward bias the emitter-base junction of the first transistor 90 and turn on the transistors 90 and 92 and the lamp 48 in the fashion previously discussed. Failure of the lamp 48 to become energized when the switch 50'' is closed would, of course, indicate a malfunction of the lamp 48 or a transistor network. Accordingly, the operativeness of the indicator circuit 34'' may be fully checked by observing the condition of the lamp 48 when the brakes are not applied and the switch 50'' is opened and closed.

It is thus seen that the subject invention makes a significant contribution to the prior art in providing brake apparatus which includes novel indicator circuit design having provisions for indicating both excessive brake lining wear and operativeness of the complete indicator circuit and a novel clip design for attaching sensors used in the indicator circuit to a brake shoe assembly for monitoring brake lining wear, though persons versed in the art will appreciate that various modifications of the illustrated embodiment may be made without departing from the spirit of the invention.

What is claimed is:

1. Vehicle brake apparatus comprising, in combination, at least one brake assembly including a brake shoe, a brake lining affixed to the brake shoe, and an electrically grounded brake drum positioned for frictional cooperation with the brake lining effective to brake the vehicle, detection means for detecting excessive wear of the brake lining including first and second terminals, a conductive wire having at least one loop formed therein connected between the terminals, and a grounded indicator network including a power source and an indicator device connected to the first terminal so as to energize the indicator device when the wire is grounded, attachment means for securing the wire loop to the brake shoe in proximity to the brake lining, the attachment means including means for supporting the loop relative to the brake shoe at a predetermined level below which brake lining wear is excessive, thereby enabling the brake drum to contact and ground the wire when the brake lining is excessively worn and the vehicle is braked so as to energize the indicator device and indicate the worn condition of the brake lining, and selectively operable switch means connected between the second terminal and ground for checking the operativeness of the detection means by selectively grounding the second terminal, thereby selectively energizing the indicator device when the detection means is operative.

2. Vehicle brake apparatus comprising, in combination, at least one brake assembly including a brake shoe, a brake lining affixed to the brake shoe, and an electrically grounded brake drum positioned for frictional cooperation with the brake lining effective to brake the vehicle, detection means for detecting excessive wear of the brake lining including first and second terminals, a conductive wire having at least one loop formed therein connected between the terminals, and a grounded indicator network including a power source and an indicator device connected to the first terminal so as to energize the indicator device when the wire is grounded, a clip for attaching the wire loop to the brake shoe in proximity to the brake lining, the clip including first and second plates spaced apart, a third plate connecting the first and second plates so as to form a unit having an open side opposed to the third plate for receiving an edge of the brake shoe, the unit being positioned on the brake shoe by inserting the edge of the brake shoe through the open side, means for securing the clip to the brake shoe so as to prevent relative movement therebetween, supporting means for supporting the wire loop at a predetermined level above the brake shoe below which level brake lining wear is deemed excessive, thereby enabling the brake drum to contact and ground the wire loop when the brake lining is worn excessively and the vehicle is braked so as to energize the indicator device and indicate the worn condition of the brake lining, and means for securing the wire loop to the supporting means so as to prevent relative movement between the wire loop and the clip, and selectively operable switch means connected between the second terminal and ground for checking the operativeness of the detection means by selectively grounding the second terminal, thereby selectively energizing the indicator device when the detection means is operative.

3. Vehicle brake apparatus comprising, in combination, at least one brake assembly including a brake shoe, a brake lining affixed to the brake shoe, and an electrically grounded brake drum positioned for frictional cooperation with the brake lining effective to brake the vehicle, detection means for detecting excessive wear of the brake lining including first and second terminals, a conductive wire having at least one loop formed therein connected between the terminals, and a grounded indicator network including a power source and an indicator device connected to the first terminal so as to energize the indicator device when the wire is grounded, a clip for attaching the wire loop to the brake shoe in proximity to the brake lining, the clip including first and second plates spaced apart, a third plate connecting the first and second plates so as to form a unit having an open side opposed to the third plate for receiving an edge of the brake shoe, the unit being positioned on the brake shoe by inserting the edge of the brake shoe through the open side, at least one projection formed in the second plate for engaging the brake shoe so as to prevent relative movement between the brake shoe and the clip, a wire loop supporting member formed in the first plate for supporting the wire loop at a predetermined level above the brake shoe below which level brake lining wear is deemed excessive, thereby enabling the brake drum to contact and ground the wire loop when the brake lining is worn excessively and the vehicle is braked so as to energize the indicator device and indicate the worn condition of the brake lining, the wire loop enclosing the supporting member, and extending between the first plate and the brake shoe, the wire being held therebetween by frictional forces so as to prevent movement of the wire loop relative to the clip, and selectively operable switch means connected between the second terminal and ground for checking the operativeness of the detection means by selectively grounding the second terminal, thereby selectively energizing the indicator device when the detection means is operative.

4. Vehicle brake apparatus comprising, in combination, a brake assembly including an electrically grounded brake drum and a brake shoe assembly having a brake lining and a brake shoe for supporting the brake lining and moving the brake lining into frictional engagement with the brake drum effective to brake the vehicle, means for indicating excessive wear of the brake lining including a conductive sensor and an indicator network having an indicator device and a power source connected to the sensor so as to energize the indicator device with the power source when the sensor is grounded, and a clip for attaching the sensor to the brake shoe so as to position the sensor proximate the brake lining and at a predetermined level above the brake shoe, the clip including a channel unit adapted for insertion of the brake shoe therein, the channel unit having one side formed by a first flange having an embossment externally directed relative to the channel unit for supporting the sensor at the predetermined level above the brake shoe and another side formed by a second flange having at least one embossment internally directed relative to the channel unit for engaging the brake shoe so as to prevent relative movement between the clip and the brake shoe, and means for securing the sensor to the externally directed embossment whereby the sensor is contacted and grounded by the brake drum when the vehicle is braked and the brake lining is worn below the predetermined level, below which level brake lining wear is deemed excessive, thereby indicating when the brake lining is excessively worn.

5. In a vehicle brake system having a plurality of brake shoes, brake linings supported by the brake shoes, and electrically grounded brake drums frictionally cooperating with the brake linings to effect braking of the vehicle, the improvement comprising, in combination, a plurality of series connected conductive sensors, means for attaching the sensors to the brake shoes proximate the brake linings, the means including sensor positioning means for supporting the sensors at a predetermined level relative to the brake shoes so as to establish a reference level below which brake lining wear is deemed excessive and for positioning the sensors in proximity to the brake drums, thereby enabling a brake drum to contact and ground a sensor when the brake lining associated therewith is excessively worn and the vehicle is braked, indicating means responsive to the potential of the sensors for indicating when one or more of the sensors are grounded, and selectively operable switch means connected in series circuit between the sensors and ground for checking the operativeness of the sensors and the indicating means by temporarily grounding the sensors.

6. In a vehicle brake system having a plurality of brake shoes, brake linings supported by the brake shoes, and electrically grounded brake drums frictionally cooperating with the brake linings to effect braking of the vehicle, the improvement comprising, in combination, first and second conductive terminals, a plurality of conductive sensors series connected between the terminals, means for attaching the sensors to the brake shoes proximate the brake linings, the means including sensor positioning means for supporting each of the sensors at a predetermined level relative to the brake shoe associated therewith so as to establish a reference level below which brake lining wear is deemed excessive and for positioning the sensors adjacent a brake drum so as to enable the brake drum to contact and ground a sensor when the brake lining associated therewith is excessively worn and the vehicle is braked, an indicator network including a power source and an indicator device series connected between ground and the first terminal so as to effect energization of the indicator device by the power source when one or more of the sensors are grounded, thereby indicating that a brake lining is excessively worn, and selectively operable switch means series connected between ground and the second terminal for checking the operativeness of the indicator network and the sensors by temporarily grounding the second terminal, thereby temporarily effecting energization of the indicator device through the sensors when the indicator network and the sensors are operable.

7. In a vehicle brake system having a plurality of brake shoes, brake linings supported by the brake shoes, and electrically grounded brake drums frictionally cooperating with the brake linings to effect braking of the vehicle, the improvement comprising, in combination, a plurality of series connected conductive wire loop sensors, a plurality of clips for attaching each of the sensors to the brake shoes proximate the brake linings supported by the respective brake shoes, the clips each including first and second plates spaced apart, a third plate joined to the first and second plates to form a unit having an open side opposed to the third plate and adapted for receiving therein an edge of a brake shoe, the clip being placed on the brake shoe by insertion of the brake shoe edge into the unit through the open side, a sensor supporting member joined to the first plate for supporting a sensor proximate a brake lining secured to the brake shoe and at a predetermined level above the brake shoe below which level brake lining wear is deemed excessive, means for securing the clip to the brake shoe, and means for securing the sensor to the clip so as to prevent relative movement therebetween and to position the sensor in proximity to a brake drum, thereby enabling the brake drum to contact and ground the sensor when the brake lining associated therewith is excessively worn and the vehicle is braked, and indicator means responsive to the potential of the sensor for indicating when the sensor is grounded so as to indicate the worn condition of the brake lining.

8. In a vehicle brake system having a plurality of brake shoes, brake linings supported by the brake shoes, and electrically grounded brake drums frictionally cooperating with the brake linings to effect braking of the vehicle, the improvement comprising, in combination, first and second conductive terminals, a plurality of conductive wire loop sensors series connected by a plurality of leads between the terminals, a plurality of clips for attaching the sensors to the brake shoes proximate the brake linings supported by the respective brake shoes, the clips each including first and second plates spaced apart, a third plate joined to the first and second plates so as to form a unit having an open side opposed to the third surface for receiving an edge of a brake shoe, the clip being attached to the brake shoe by insertion of the brake shoe edge through the open side of the unit, the first and third plates each having removed portions for the passage of leads therethrough to a sensor, a sensor supporting member joined to the first plate for supporting the sensor proximate a brake lining and at a predetermined level above the brake shoe as to establish a reference level below which brake lining wear is deemed excessive and for positioning the sensor adjacent a brake drum associated with the brake lining, thereby enabling the brake drum to contact and ground the sensor when the brake lining is excessively worn and the vehicle is braked, the sensor being positioned so as to loop the sensor supporting member, engagement means including at least one projection secured to the second plate for preventing relative movement between the clip and the brake shoe by engaging the brake shoe with the projection, and means for securing the sensor to the clip by frictionally restraining the leads to the sensor between the clip and the brake shoe, indicating means connected to the first terminal so as to be responsive to the potential of the sensor for indicating when the sensor is grounded, thereby indicating the worn condition of the brake lining, and selectively operable switch means series connected between the second terminal and ground for checking the operativeness of the indicating means and the sensors by selectively grounding the sensors.

* * * * *